June 10, 1924.  1,497,607
A. STREPPEL
SEPARATING OF OIL FROM SAND
Filed June 30, 1920   2 Sheets-Sheet 1
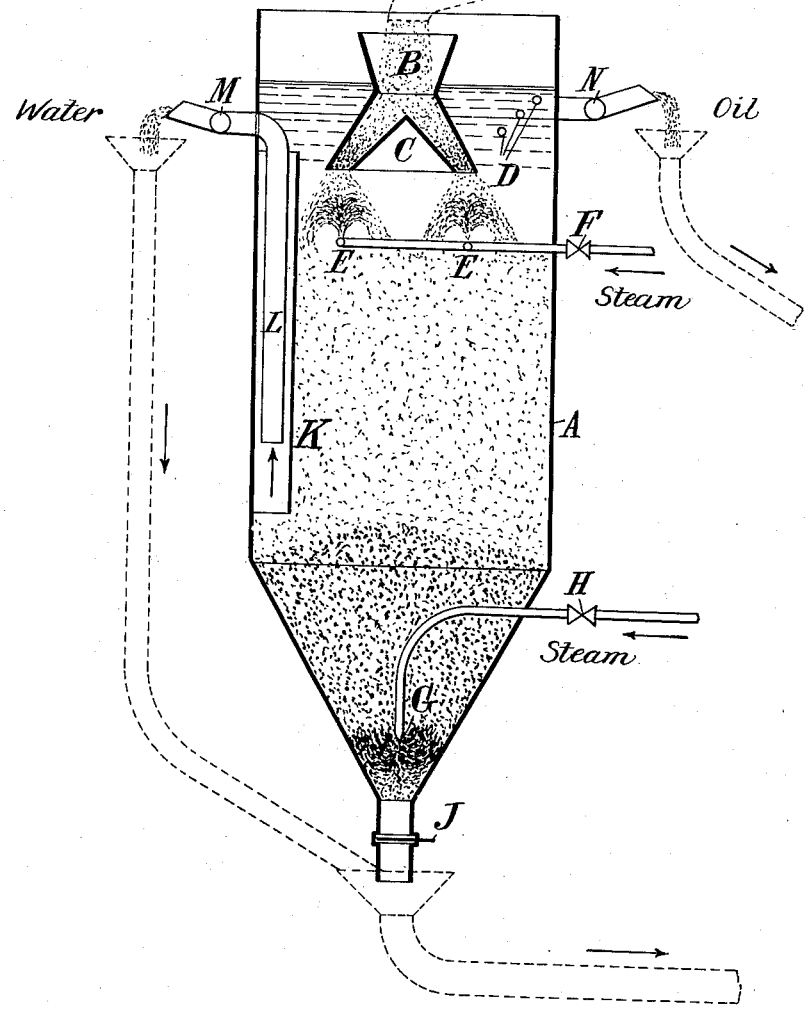
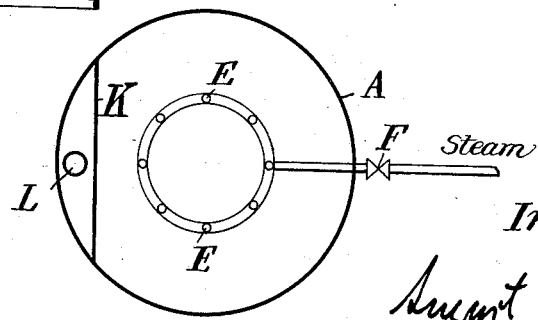
Inventor:
August Streppel June 10, 1924. 1,497,607
A. STREPPEL
SEPARATING OF OIL FROM SAND
Filed June 30, 1920  2 Sheets-Sheet 2
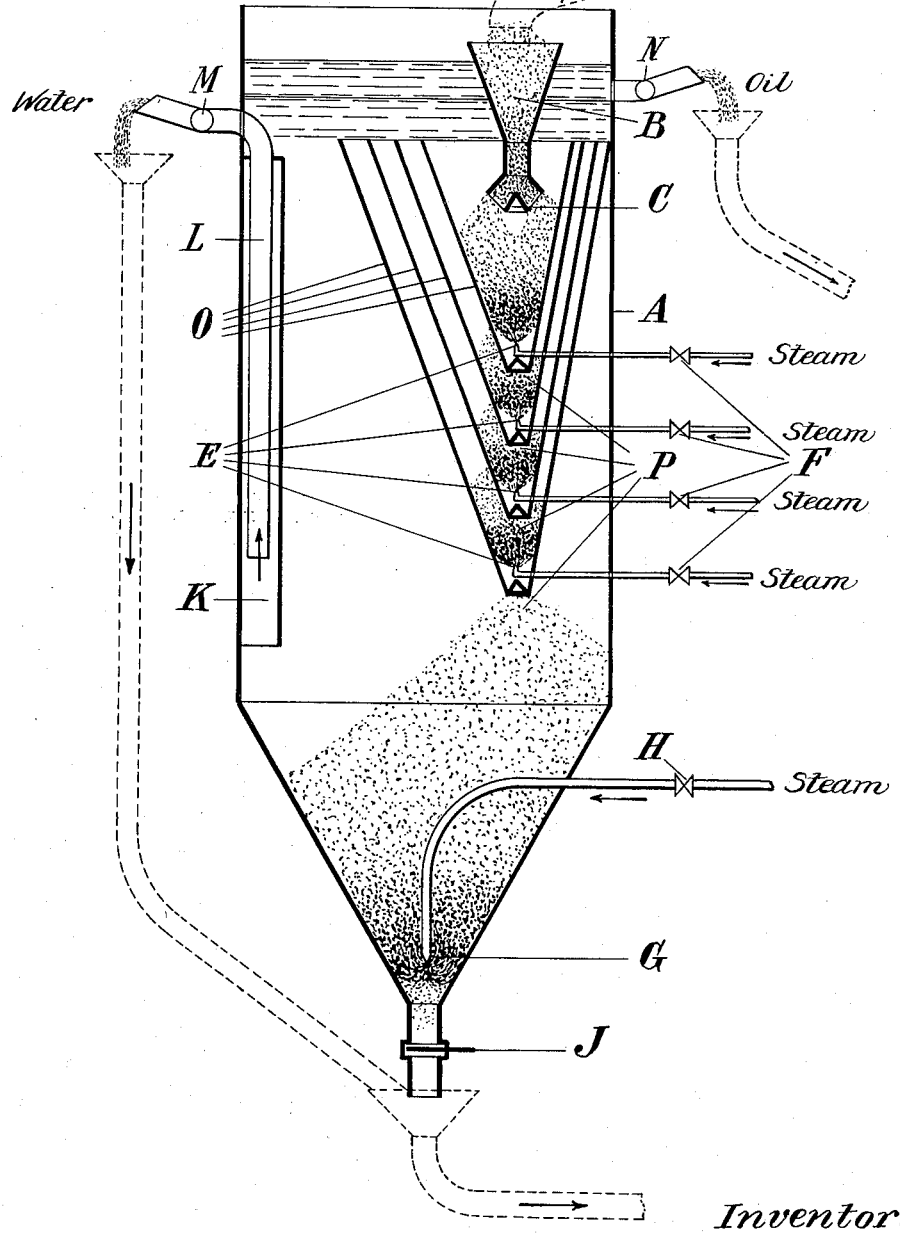
Inventor:
August Streppel Patented June 10, 1924.

1,497,607

UNITED STATES PATENT OFFICE.

AUGUST STREPPEL, OF BERLIN-WILMERSDORF, GERMANY, ASSIGNOR TO THE FIRM: DEUTSCHE ERDÖL AKTIENGESELLSCHAFT, OF BERLIN-SCHONEBERG, GERMANY.

SEPARATING OF OIL FROM SAND.

Application filed June 30, 1920. Serial No. 393,220.

*To all whom it may concern:*

Be it known that I, AUGUST STREPPEL, a citizen of the German Empire, residing at Berlin-Wilmersdorf, Germany, have invented certain new and useful Improvements in the Separating of Oil from Sand (for which I have filed applications in Germany, March 14, 1919, April 24, 1919, and April 23, 1919; France, March 10, 1920; Rumania, April 5, 1920; Poland, March 22, 1920), of which the following is a specification.

My invention relates to the recovering of petroleum (mineral oil) from strata of sand and the like saturated with the oil and its particular object is a method and the means for carrying it into effect, by the aid of which such oil can be separated easily and with the least possible loss from the sand or other mineral which it is admixed to. The mixture of oil and sand, the treatment of which forms the primary object of the present invention, shall be referred to hereinafter and in the claims affixed to this specification as "oil-sand."

Now, in order to effect the separation of oil and sand referred to, according to the present invention, the oil-sand is conveyed by the aid of a current of water through open or closed gutters, channels or pipes, the same as in the well known flushing process, into a separator. Here the oil is separated from the sand with the aid of steam, and more particularly jets of steam, the oil on account of its lower specific gravity forming a layer supernatant on the water, while the sand will form a deposit on the bottom of the vessel wherein the treatment is carried through, oil and sand being easily tapped off separately, while the water escapes and can be utilized anew for the transport of further quantities of oil-sand.

The particular effect exerted upon the oil-sand by the steam primarily consists therein that the single grains of sand are freed from oil by their relative movement, caused by the steam injected, and by the friction between the individual grains of sand on the one hand and between the sand and the water on the other hand, which results from such movement. There is, however, another effect connected with the injection of steam, viz the increase in temperature which causes the viscosity of the oil to change and in rendering the oil more liquid facilitates and accelerates its separation from the sand, to which it adheres.

In the drawings affixed to this specification and forming part thereof two modifications of a separating device adapted for use in practising my novel method are illustrated by way of example in a purely diagrammatic manner. In the drawings—

Figs. 1 and 2 are a vertical section and a cross-section, respectively, of the one modification:

Fig. 3 is a vertical section of the other one.

Referring to Figs. 1 and 2 of the drawings. A is the separator vessel and B is an inlet having the form of two funnels joined together with their bases. This inlet receives the oil-sand recovered by mining methods and mixed with the water used for flushing, the mixture of oil-sand and water flowing through open or closed channels or pipes (indicated in dotted lines above the vessels A in the drawings).

A distribution cone C inserted in the lower part of inlet B serves to impart to the said inlet an annular section. Underneath the said inlet and concentrically thereto there is disposed a circular steam pipe carrying steam nozzles E and provided with a stop cock F. The steam jets escaping from the said nozzles whirl up the oil-sand sinking down in the water and, in doing so, cause an energetic mutual friction of the individual particles of sand to be created which together with the increase in temperature resulting from the heating effect of the steam will cause the oil to be separated from the sand. This latter in sinking down in the vessel A collects in the lower funnel-shaped part of the separating vessel, while the oil ascends above the surface of the water and there forms a supernatant layer.

The oil is tapped off by means of the upper drain-pipe N provided with an adjustable mouth-piece allowing the oil-level to be regulated and either a continuous or an intermittent escape of oil to take place. In order to be able to easily ascertain the oil level, when the oil is tapped off in intervals, a number of test cocks D are provided one above the other.

The water escapes through the lateral tube L which is surrounded by a protective jacket K in order to keep out sand and oil, the said jacket serving for calming the water column enclosed therein, whereby the sinking down of the sand and the ascending of the oil is promoted. Tube L has the form of a dip-pipe, and thus prevents any oil from being admixed to the water escaping through it. The swivel joint tube M permits controlling the escape of water and to regulate it at will.

The sand freed from oil is tapped off by aid of the main valve J. A steam nozzle G provided above said valve and fed with steam by means of stop cock H serves for slackening the sand accumulated above valve J so that this latter is prevented from being choked up.

The water escaping can be utilized for conveying fresh oil-sand into the container A or for transporting the clean sand tapped off through valve J into the hollows of the mine or on to the dump.

The device illustrated in Fig. 3 differs from the one described above in different points. Underneath the inlet B there are disposed a number of guide funnels one underneath the other, each funnel having its bottom end provided with a conical stop valve and with a spray nozzle arranged above said valve. In this manner the oil-sand sinking down is compelled to pass by a plurality of nozzles before reaching the bottom part of the separating vessel, and the steam entering through the said nozzles causes the sand to be whirled up again and again and the oil adhering thereto to be heated repeatedly and to be thus separated from the sand in a more perfect way.

After the oil-sand has left the inlet funnels B, it is met within the uppermost guide funnels O by the first spray nozzle E fed with steam through cock F. After whirling the sand up for a short time the steam is shut off and the sand itself owing to its superior specific gravity accumulates in the bottom part of the funnel while the separated oil ascends to the surface. If now the conical valve P is opened, the sand will sink downwards into the funnel O next succeeding in order to be treated there in a like manner. The same treatment is reiterated in the third and four funnels and the sand is thus freed from the last traces of oil.

While the oil-sand is thus caused to gradually pass through the different funnels, it is equally possible to subject it to a continuous treatment by permanently keeping all the steam nozzles and valves open.

It has further proved advantageous to provide the separating vessel with an airtight cover, the admission of steam being at the same time regulated in such a manner as to generate within the said vessel a pressure of several atmospheres which allows of considerably increasing the temperature of the water. This increase of temperature and the increased liquefaction of the oil caused thereby has the effect of considerably accelerating the separation of the oil and to reduce the quantity of oil still adhering to the sand, so that the output of oil is improved quite materially.

I wish it to be understood that I do not desire to be limited to the exact details of the modifications of my invention shown in the drawings and described in the foregoing, for obvious modifications will occur to any person skilled in the art.

I claim:

1. The method of treating oil sand with a view to separating the oil from the sand, consisting in introducing the oil sand from above into a column of water of substantial height and causing upwardly directed steam jets to act upon the sand in the upper part of said column of water.

2. The method of treating oil sand with a view to separating the oil from the sand, consisting in introducing the oil sand from above into a column of water of substantial height and causing upwardly directed steam jets to act at increased pressure upon the sand in the upper part of said column of water.

3. Oil sand separating device comprising a trough adapted to contain a high column of water, means for introducing oil sand into said column from above and a steam nozzle in the upper part of said trough adjoining the lower end of said introducing means.

4. In a device of the kind described in combination, a water vessel, means for introducing oil sand into said vessel from above and a plurality of spray nozzles disposed on different levels underneath said introducing means.

5. In a device of the kind described in combination, a water vessel, means for introducing oil sand into said vessel from above, a plurality of superposed guide funnels, a valve in the bottom of each funnel and a spray nozzle above each valve.

6. In a device of the kind described in combination, a water vessel, means for introducing oil sand into said vessel from above, a spray nozzle underneath said introducing means, a bottom valve in said vessel and a steam nozzle above said bottom valve.

In testimony whereof I affix my signature.

AUGUST STREPPEL.